(12) United States Patent
Morimoto et al.

(10) Patent No.: US 8,350,531 B2
(45) Date of Patent: Jan. 8, 2013

(54) SECONDARY BATTERY CHARGE CONTROL METHOD AND CHARGE CONTROL CIRCUIT

(75) Inventors: Naohisa Morimoto, Osaka (JP); Toshihiro Inoue, Osaka (JP)

(73) Assignee: Panasonic Corporation, Osaka (JP)

( * ) Notice: Subject to any disclaimer, the term of this patent is extended or adjusted under 35 U.S.C. 154(b) by 368 days.

(21) Appl. No.: 12/681,738

(22) PCT Filed: Oct. 3, 2008

(86) PCT No.: PCT/JP2008/002786
§ 371 (c)(1),
(2), (4) Date: Apr. 5, 2010

(87) PCT Pub. No.: WO2009/044557
PCT Pub. Date: Apr. 9, 2009

(65) Prior Publication Data
US 2010/0213901 A1    Aug. 26, 2010

(30) Foreign Application Priority Data

Oct. 5, 2007 (JP) .................................. 2007-261753

(51) Int. Cl.
*H02J 7/16* (2006.01)
*H02J 7/04* (2006.01)

(52) U.S. Cl. ........ 320/145; 320/148; 320/150; 320/155; 320/162

(58) Field of Classification Search ............ 320/145
See application file for complete search history.

(56) References Cited

U.S. PATENT DOCUMENTS

| 5,523,671 | A | * | 6/1996 | Stewart ................. 320/152 |
| 5,736,834 | A | * | 4/1998 | Kuno ...................... 320/146 |
| 5,828,202 | A | * | 10/1998 | Tamai ..................... 320/141 |
| 5,945,811 | A | * | 8/1999 | Hasegawa et al. ........... 320/141 |
| 6,154,011 | A | * | 11/2000 | Lam et al. ................. 320/139 |
| 6,281,663 | B1 | | 8/2001 | Yagi et al. |
| 6,707,272 | B1 | * | 3/2004 | Thandiwe ................. 320/141 |
| 7,109,875 | B2 | * | 9/2006 | Ota et al. ................. 340/635 |
| 2005/0134231 | A1 | | 6/2005 | Cho |

FOREIGN PATENT DOCUMENTS

| JP | 9-117075 | 5/1997 |
| JP | 10-290534 | 10/1998 |
| JP | 2001-016795 | 1/2001 |
| JP | 3391045 | 3/2003 |
| JP | 2006-092850 | 4/2006 |
| JP | 2006-340527 | 12/2006 |

OTHER PUBLICATIONS

European Search Report issued in European Patent Application No. EP 08836779.2 dated Nov. 25, 2011.

* cited by examiner

*Primary Examiner* — Yalkew Fantu
(74) *Attorney, Agent, or Firm* — McDermott Will & Emery LLP

(57) ABSTRACT

A secondary battery charge control method includes: a charge control step of executing charging by supplying a charge current to a secondary battery; a charge information acquisition step of acquiring information relating to the charging executed in the charge control step; a storage step of storing the information acquired in the charge information acquisition step as charge data; and a charge inhibition determination step of determining whether to inhibit the charging in the charge control step on the basis of the charge data of a previous cycle that have been stored in the storage step when charging in the charge control step is started again after charging in the charge control step has been completed.

13 Claims, 3 Drawing Sheets

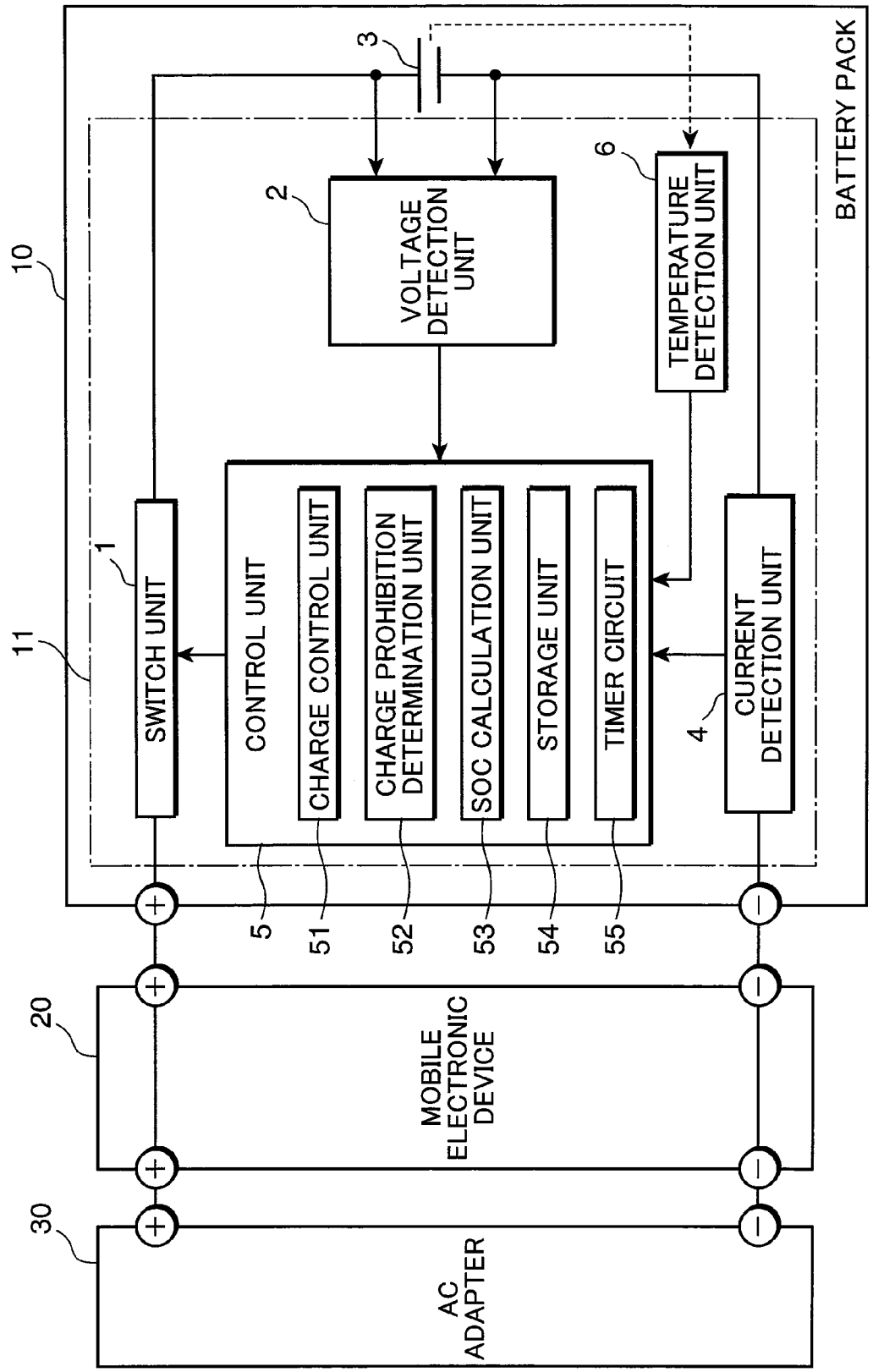

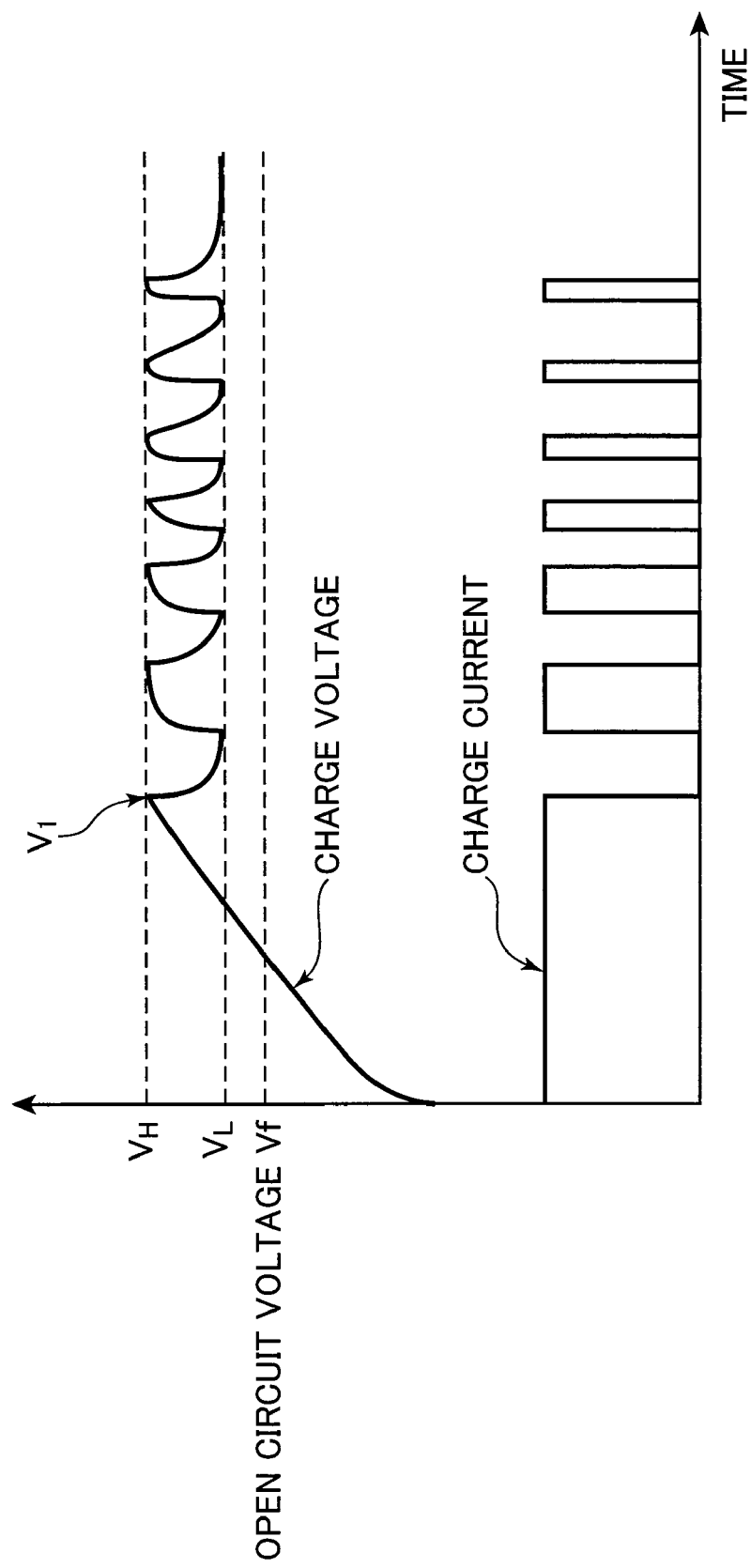

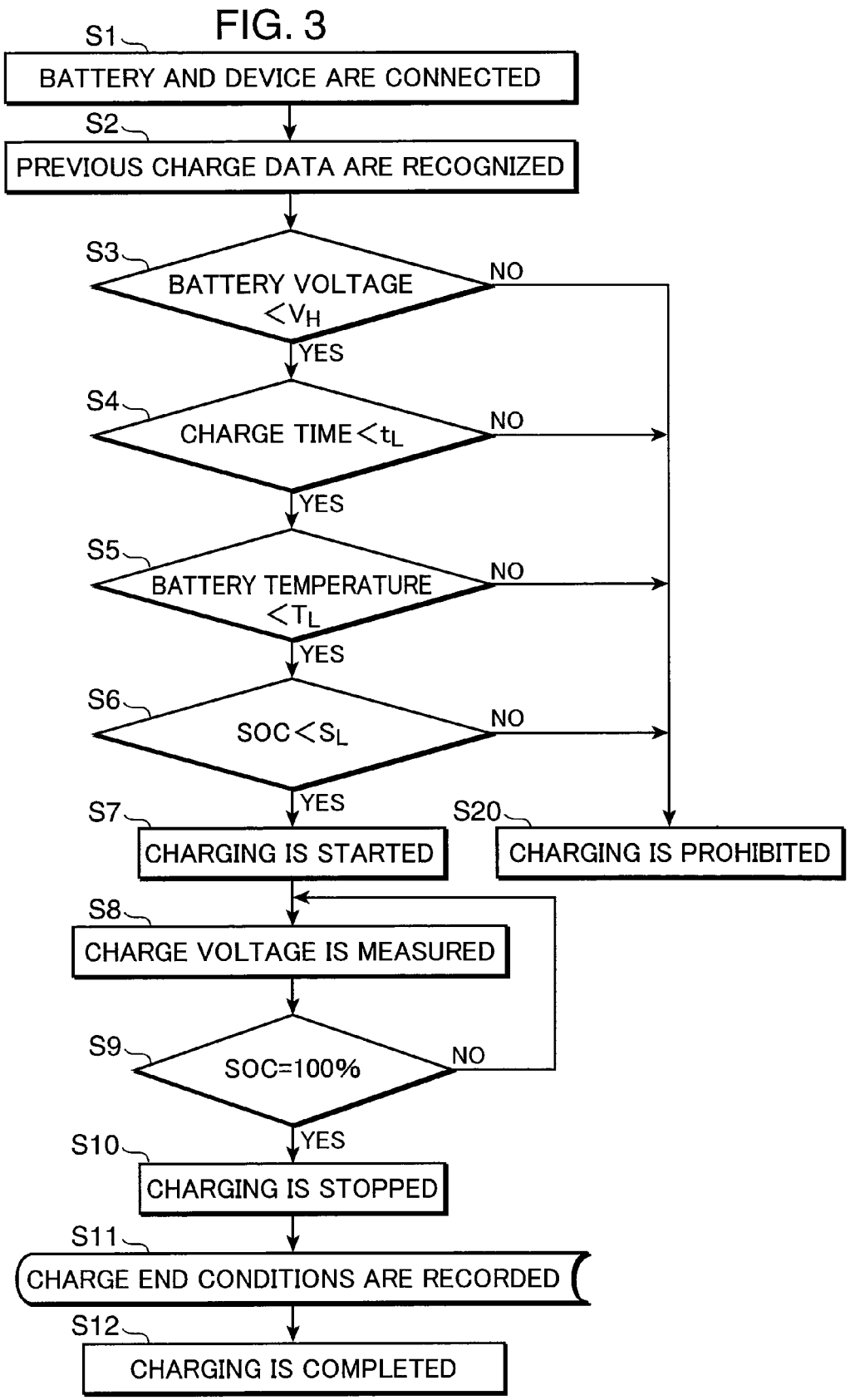

SECONDARY BATTERY CHARGE CONTROL METHOD AND CHARGE CONTROL CIRCUIT

RELATED APPLICATIONS

This application is the U.S. National Phase under 35 U.S.C. §371 of International Application No. PCT/JP2008/002786, filed on Oct. 3, 2008, which in turn claims the benefit of Japanese Application No. 2007-261753, filed on Oct. 5, 2007, the disclosures of which Applications are incorporated by reference herein.

TECHNICAL FIELD

The present invention relates to a charge control method and a charge control circuit for secondary batteries that are widely used in mobile electronic devices and the like, and more particularly to a charge control method and charge control circuit that are suitable for pulse charging of a secondary battery.

BACKGROUND ART

Following the reduction in size and weight of electronic devices such as cellular phones and notebook personal computers, a demand has been created for increased capacity of secondary batteries that serve as power sources for such mobile electronic devices. Lithium secondary batteries that are also called lithium ion batteries have been widely used as secondary batteries in mobile electronic devices, because such batteries have an energy density higher than that of nickel-hydride batteries.

Where charge control of lithium secondary batteries is not conducted accurately, heat is generated and charge efficiency drops. Therefore, pulse charging has been widely used as a charge method that enables charging within a comparatively short time.

An active material used in a lithium secondary battery is maintained stable by a solid electrolyte film called SEI (Solid Electrolyte Interface) that is formed on the surface of the active material. Therefore, attention should be paid to heat generation during charging and the so-called thermal runaway, and a method suitable for safe charging within a short time is required. Accordingly, various charge control methods and means suitable for a pulse charge method have been studied as charge methods for lithium secondary batteries.

Patent Document 1 discloses a charge method by which charging is conducted at a reduced pulse charge voltage or a reduced pulse charge current by detecting the surrounding temperature when the battery is charged. Further, it is indicated that when the battery temperature is higher than a set temperature, the pulse charge voltage is taken as 4.2 to 4.4 V/cell.

Patent Document 2 discloses a process in which a recommended charge voltage that is recommended and a voltage that is equal to or higher than the recommended charge voltage are alternately pulse charged, deterioration of the battery is prevented, and highly reliable charging is performed. Further, a method for fixing the pulse frequency and two types of methods for changing the application duty are described and it is indicated that the duty of voltage application that is equal to or higher than the recommended charge voltage is changed.

Patent Document 3 discloses a charge method by which the OFF time is extended when the battery voltage is low and the OFF time is shortened as the battery voltage rises.

In order to charge a secondary battery within a short time, while ensuring sufficient safety, it is necessary to inhibit side reactions during charging and conduct the charging with good efficiency. Further, because the secondary battery generated heat during charging, it is necessary to detect the battery temperature and control the variations in charge voltage.

When a secondary battery is used repeatedly in a mobile device, the battery gradually deteriorates. As a result, the internal impedance (internal resistance) of the battery increases. When the battery is charged under voltage control, the charge voltage is a voltage obtained by adding a charge overvoltage, which is the voltage represented by a product of the internal impedance (internal resistance) and a charge current, to an electromotive force of the secondary battery. Therefore, if the battery is charged with the same charge voltage when the internal impedance (internal resistance) is small in the initial period in which the secondary battery has not yet deteriorated and after the secondary battery has deteriorated and the internal resistance increases, the charge overvoltage will be higher in a case with the increased internal resistance. As a result, the electromotive force of the secondary battery, which is the voltage component of the charge voltage that contributes to charging, that is, the open circuit voltage of the secondary battery will decrease. Therefore, where the secondary battery is charged at a constant charge voltage, when the internal resistance of the secondary battery is large, the situation is essentially identical to that in which the battery is charged at a low charge voltage when the internal resistance is low.

Thus, where the secondary battery deteriorates and the internal resistance increases, the charge voltage essentially decreases. Therefore, the charge-discharge efficiency decreases, and the discharge capacity that can be discharged after the charging is completed in the charge-discharge cycle decreases. In other words, the battery capacity decreases and the battery life is determined to be reached.

In terms of inhibiting the above-described phenomena and charging the battery within a comparatively short time, a pulse charge method is known to be more effective than the above-described charge method based on voltage control in which charging is conducted at a constant voltage. However, a problem associated with the pulse charging method is that the battery temperature during charging rises due to the application of the charge pulse. Therefore, it is necessary to conduct efficient charging, while inhibiting the increase in battery temperature. Further, when the battery is externally damaged or internal damage occurs due to repeated charging and discharging, the increase of the internal resistance or the internal short circuit can occur in the battery. Unreasonable charging of such an abnormal battery that has been damaged should be avoided.

Thus, in the pulse charge method, the terminal voltage is raised by passing a constant current (ON) to the secondary battery, and where the terminal voltage reaches a predetermined upper limit voltage, the current is stopped (OFF). Further, where the terminal voltage decreases and reaches a predetermined lower limit voltage, the constant current is supplied again (ON). Such a repeated supply of pulsed charge current to the secondary battery results in pulse charging of the battery.

However, where an abnormal battery in which the internal short circuit has occurred is unreasonably pulse charged by a constant current, because the terminal voltage does not rise, the terminal voltage does not reach the upper limit voltage. Accordingly, the resultant problem is that where the secondary battery is maintained in a state in which a constant current is supplied thereto, the battery is charged for a long time with a constant current and intensive heat generation occurs in the battery.

Patent Document 1 discloses a charge method by which charging is conducted at a reduced pulse charge voltage or a reduced pulse charge current by detecting the surrounding temperature when the battery is charged. Further, it is indicated that when the battery temperature is higher than a set temperature, the pulse charge voltage is taken as 4.2 to 4.4 V/cell. However, these methods are by themselves insufficient, and where the charge efficiency drops due to factors other than the temperature or a voltage exceeding the charge control voltage is applied due to a problem that has occurred in the battery or device and a current equal to or higher than a preset current flows, the detection of temperature alone does not terminate the overcharge state and problems are associated with battery safety during charging.

Patent Document 2 discloses a process in which a recommended charge voltage that is recommended and a voltage that is equal to or higher than the recommended charge voltage are alternately pulse charged, deterioration of the battery is prevented, and highly reliable charging is performed. Further, a method for fixing the pulse frequency and two types of methods for changing the application duty are described and it is indicated that the duty of voltage application that is equal to or higher than the recommended charge voltage is changed. However, the disclosed method is highly reliable as long as the battery or charging device are normal, but when any abnormality occurs in the battery or charge device, the battery generates heat and problems are associated with safety during charging even when normal charging is conducted.

Patent Document 3 discloses a charge method by which the OFF time is extended when the battery voltage is low and the OFF time is shortened as the battery voltage rises. The disclosed method is also highly reliable as long as the battery or charging device are normal, but when any abnormality occurs in the battery or charge device, the battery generates heat and problems are associated with safety during charging even when normal charging is conducted.

Patent Document 1: Japanese Patent Application Laid-open No. 2001-16795
Patent Document 2: Japanese Patent Application Laid-open No. 9-117075
Patent Document 3: Japanese Patent No. 3391045

DISCLOSURE OF THE INVENTION

With the foregoing in view, it is an object of the present invention to provide a secondary battery charge control method and charge control circuit that ensure safety of the secondary battery, in particular a lithium secondary battery.

A charge control method according to one aspect of the present invention includes: a charge control step of
executing charging by supplying a charge current to a secondary battery; a charge information acquisition step of acquiring information relating to the charging executed in the charge control step; a storage step of storing the information acquired in the charge information acquisition step as charge data; and a charge inhibition determination step of determining whether to inhibit the charging in the charge control step on the basis of the charge data of a previous cycle that have been stored in the storage step when charging in the charge control step is started again after charging in the charge control step has been completed.

A charge control circuit according to one aspect of the invention includes: a charge control unit that executes charging by supplying a charge current to a secondary battery; a charge information acquisition unit that acquires information relating to the charging executed by the charge control unit; a storage unit that stores the information acquired by the charge information acquisition unit as charge data; and a charge inhibition determination unit that determines whether to inhibit the charging by the charge control unit on the basis of the charge data of a previous cycle that have been stored in the storage unit when charging by the charge control unit is started again after charging by the charge control unit has been completed.

With such a configuration, when charge data acquired during a previous charge demonstrate any abnormality, unreasonable charging of such an abnormal secondary battery can be avoided. As a result, safety of the secondary battery can be ensured.

BRIEF DESCRIPTION OF THE DRAWINGS

FIG. 1 is a block diagram illustrating an example of a charge control circuit that uses a secondary battery charge control method of one embodiment of the present embodiment.

FIG. 2 is an explanatory drawing illustrating the relationship between the charge voltage and charge current during pulse charging of a secondary battery.

FIG. 3 is a flowchart of charge control of the present embodiment.

BEST MODE FOR CARRYING OUT THE INVENTION

The charge control method in accordance with the present invention is a charge control method for a secondary battery suitable for a mobile electronic device, including recording and holding charge data at the charge end time in advance and determining a control prohibition by reading charge data of a previous cycle that have been recorded and held in advance at the charge start time and comparing them with a predetermined threshold value. With this method, even when some sort of abnormality occurs in the battery or a charging device, the charging can be ended, abnormal heat generation in the battery or charging device can be prevented, and safety can be ensured.

Further, the charge data during charging are recorded and held for each charging. The charge data of the previous cycle may be recorded and held either by a charge control circuit or a battery pack. The charge control circuit may be incorporated in the mobile electronic device or an external charger that is called a special charging adapter or the like. When recording and holding is made by a battery pack, even if the battery pack is connected for charging to a separate mobile electronic device or external charging device, because the charge data of the pervious cycle have been recorded and held in the battery pack, no new charging is performed and the battery safety can be increased.

Another specific feature is that the charge data during charging are recorded in the charge control circuit or battery pack for each charging, data obtained during charging of the pervious cycle are read during charging of the next cycle, and at least one from among the charge time, battery temperature, state of charge (SOC), and highest voltage of charge is used to determine a threshold during charging.

In accordance with the present invention, pulse charging is conducted within a range between an upper limit voltage and a lower limit voltage that have been set in advance at a constant current, and it is preferred that both the upper limit voltage and the lower limit voltage be equal to or higher than an open circuit voltage of the secondary battery because the secondary battery is prevented from being repeatedly charged immediately after charging and being overcharged.

The secondary battery in accordance with the present invention is preferably a lithium secondary battery because the secondary battery with a high energy density can be protected from unsafe phenomena such as abnormal heat generation.

The preferred embodiments of the present invention will be described below with reference to the appended drawings. However, the embodiments described below merely illustrate a secondary battery charge control method and configuration for realizing the technical concept of the invention, and the invention is not limited to the below-described method and configuration.

FIG. 1 is a block diagram illustrating an example of configuration of a battery pack 10 including a charge control circuit that uses a secondary battery charge control method of one embodiment of the present embodiment. In the configuration shown in FIG. 1, charging is executed by a charge control circuit 11 contained in the battery pack 10. An AC adapter 30 shown in FIG. 1 has a stable characteristic as a power source for charging and supplies a constant charge current $I_{CHG}$.

A secondary battery 3 is connected to the charge control circuit 11. Various secondary batteries, for example a lithium ion secondary battery, can be used as the secondary battery 3.

The AC adapter 30 is connected to a mobile electronic device 20, and the mobile electronic device 20 is connected to the battery pack 10. The mobile electronic device 20 may be any of a variety of electronic devices driven by a battery, such as a portable personal computer, a digital camera, and a cellular phone.

A constant charge current $I_{CHG}$ is generated, for example, by a constant current circuit contained in the mobile electronic device 20 from a voltage outputted from the AC adapter 30, and the generated current is supplied to the charge control circuit 11 contained in the battery pack 10 and converted by the charge control circuit 11 into pulses, and then supplied to the secondary battery 3, thereby ensuring pulse charging of the secondary battery 3.

The charge control circuit 11 is provided with a switch unit 1 that conducts ON/OFF switching of the charge current, a voltage detection unit 2 that detects a battery voltage, a current detection unit 4 that detects a current flowing in the secondary battery 3, a temperature detection unit 6 that detects a temperature of the secondary battery 3, and a control unit 5 that performs the complete control of pulse charging. The charge control circuit 11 is not limited to the example in which it is contained in the battery pack 10. For example, the charge control circuit may be also contained in the mobile electronic device 20 or a special charging device.

The switch unit 1 is constituted, for example, by a charge switch that switches on and off the electric current in the charge direction of the secondary battery 3 and a discharge switch that switches on and off the electric current in the discharge direction of the secondary battery 3. For example, a semiconductor switching element such as a FET (Field Effect Transistor) can be used as the switch unit 1 (charge switch, discharge switch).

The voltage detection unit 2 is constituted, for example, by using an analog-digital converter.

The current detection unit 4 is constituted, for example, by using a shunt resistor or a current converter connected in series with the secondary battery 3 and an analog-digital converter and serves to detect a current value of the current flowing in the secondary battery 3 as a charge-discharge current value Id and output a signal indicating the charge-discharge current value Id to the control unit 5. The charge-discharge current value Id is selected for example such that a current in the charge direction of the secondary battery 3 is shown by a plus (positive) value and a current in the discharge direction of the secondary battery 3 is shown by a minus (negative) value.

The control unit 5 is constituted, for example, by a CPU (Central Processing Unit) that executes a predetermined computational processing, a ROM (Read Only Memory) that stores a predetermined control program, a RAM (Random Access Memory) that temporarily stores the data, a storage unit 54 constituted by a nonvolatile storage element such as EEPROM (Electrically Erasable and Programmable Read Only Memory), a timer circuit 55 (timing unit), and peripheral circuits thereof.

By executing the control program stored, for example, in the ROM, the control unit 5 functions as a charge control unit 51, a charge prohibition determination unit 52, and an SOC calculation unit 53. The timer circuit 55, temperature detection unit 6, SOC calculation unit 53, and voltage detection unit 2 correspond to examples of a charge information acquisition unit.

The SOC calculation unit 53 calculates an integral charge quantity Q by integrating continuously the charge-discharge current value Id outputted from the current detection unit 4. During the integration, because the charge-discharge current value Id has a positive value in the charge direction and a negative value in the discharge direction, the charged electric charge is added during charging and the discharged electric charge is subtracted during discharging in order to calculate the integral charge quantity Q that has been charged into the secondary battery 3. The SOC calculation unit 53 calculates the SOC of the secondary battery 3 by calculating the ratio of the integral charge quantity Q to the full-charge capacity of the secondary battery 3.

The charge control unit 51 supplies a pulsed charge current to the secondary battery 3 and executes pulse charging by switching on and off the switch unit 1. For example, where the SOC calculated by the SOC calculation unit 53 is equal to or greater than a standard value (for example, 100%), the charge control unit 51 switches off the switch unit 1 and ends the pulse charge. The charge control unit 51 is not limited to the example in which a pulsed charge current is obtained by switching on and off the switch unit 1. For example, the charge current may be also switched on and off, for example, by outputting an indication signal to a charge device of the mobile electronic device 20. Further, the charge control device 51 is not limited to executing the pulsed charging and may also execute, for example, a constant current charging and a constant voltage charging.

FIG. 2 illustrates the behavior of the charge battery voltage and charge current when a constant current pulse charging is executed by the charge control unit 51. The charging is conducted with a constant current, the switch unit 1 is switched on and off between an upper limit voltage VH of the pulsed control voltage and a lower limit voltage VL of the pulsed control voltage, and the charge current of the secondary battery 3 is switched on and off. The upper limit voltage VH and lower limit voltage VL are both set to voltages that are higher than an open circuit voltage Vf at a time of full charge of the secondary battery 3.

More specifically, where the switch unit 1 is switched on by the charge control unit 51 and charging is started at a constant current, the battery voltage reaches the upper limit voltage VH (a point represented by reference symbol V1 in FIG. 2). In this case, because the secondary battery 3 has not yet been fully charged, the open circuit voltage at this time is lower than the open circuit voltage Vf at the time of full charge. However, a voltage drop generated by the charge current flowing through the internal resistance of the secondary battery 3 is added and the battery voltage (charge voltage) becomes higher than the open circuit voltage Vf at the time of full charge.

Where the battery voltage detected by the voltage detection unit 2 is equal to or higher than the upper limit voltage VH, the charge control unit 51 switches off the switch unit 1 and cuts off the charge current. As a result, the secondary battery 3 becomes an open circuit state and the battery voltage gradually decreases. Further, where the battery voltage is equal to or lower than the lower limit voltage VL, the charge control unit 51 switches on the switch unit 1 and causes the charge current to flow. As a result, the charge current flows continuously till the battery voltage again reaches the upper limit voltage VH, and the secondary battery 3 is charged.

Pulse charging is thus executed by switching on and off the charge current. Where the SOC of the secondary battery 3 that has been calculated by the SOC calculation unit 53 becomes the standard value that has been set in advance, for example, 100%, the charge control unit 51 determines that the secondary battery 3 is fully charged, switches off the switch unit 1, and ends the pulse charging.

The charge control unit 51 also measures the charge time from the start to the end of pulse charging with the timer circuit 55 and stores the measured charge time as the charge data in the storage unit 54. Further, when the charge time that has been measured by the timer circuit 55 exceeds a charge time (tL) that has been set in advance as a time necessary to charge fully the secondary battery 3 from a state with an SOC of 0% before the SOC of the secondary battery 3 that has been calculated by the SOC calculation unit 53 reaches the standard value (for example, 100%), the charge control unit 51 ends the pulse charging.

The temperature detected by the temperature detection unit 6 is also stored by the charge control unit 51 as the charge data in the storage unit 54 within the pulse charging execution period. The charge control unit 51 may store in the storage unit 54 only the highest value of temperature detected by the temperature detection unit 6 during charging.

The SOC of the secondary battery 3 that has been calculated by the SOC calculation unit 53 is also stored by the charge control unit 51 as the charge data in the storage unit 54 when the pulse charging ends.

The terminal voltage of the secondary battery 3 that has been detected by the voltage detection unit 2 is also stored by the charge control unit 51 as the charge data in the storage unit 54. The charge control unit 51 may store only the highest value of the terminal voltage detected by the voltage detection unit 2 during charging in the storage unit 54. The terminal voltage at the end of charging is usually the highest. Therefore, the charge control unit 51 may take the terminal voltage detected by the voltage detection unit 2 at the end of charging and store this highest voltage in the storage unit 54.

Based on the charge data of the previous cycle that have been stored in the storage unit 54, the charge prohibition determination unit 52 determines whether to prohibit the charging with the charge control unit 51 when pulse charging with the charge control unit 51 is started again after pulse charging with the charge control unit 51 has been completed.

More specifically, the charge prohibition determination unit 52 prohibits the charging with the charge control unit 51 when the charge time of the previous cycle that has been stored as the charge data in the storage unit 54 exceeds the charge time (tL) that has been set in advance to be equal to or longer than the time necessary to charge fully the secondary battery 3 with the charge control unit 51 from the state with an SOC of 0%.

For example, when the secondary battery 3 is in an abnormal state in which, for example, the internal resistance has increased or an open circuit accident has occurred, the charge current does not flow. Therefore, the value of SOC calculated by the SOC calculation unit 53 does not increase, the charging end is still not reached, and the charge time extends. Therefore, when the charge time of the previous cycle that has been stored as the charge data in the storage unit 54 exceeds the charge time (tL), it can be assumed that an abnormality such as an increase in internal resistance during charging of the previous cycle has occurred in the secondary battery 3.

Accordingly, when the charge time of the previous cycle that has been stored as the charge data in the storage unit 54 exceeds the charge time (tL), the abnormal battery can be prevented from being unreasonably charged by prohibiting the charging with the charge control unit 51. As a result, safety of the secondary battery 3 can be ensured.

Further, the charge prohibition determination unit 52 prohibits the charging with the charge control unit 51 when the temperature of the previous cycle that has been stored as the charge data in the storage unit 54 exceeds a determination temperature (TL) that has been stored in advance as a temperature at which the secondary battery 3 is at risk of deterioration. For example, a temperature obtained by adding a margin to a temperature at which no deterioration of the secondary battery 3 occurs or a temperature at which thermal runaway occurs is set as the determination temperature (TL). For example, a temperature of about 80° C. is set.

When the highest temperature during the previous charge is stored as the charge data in the storage unit 54, the charge prohibition determination unit 52 may determine whether to inhibit the charging by comparing this highest temperature with the determination temperature (TL). Further, when the temperature of the secondary battery 3 in the previous charge has been stored as a plurality of charge data in a time series in the storage unit 54, the charge prohibition determination unit 52 may determine whether to inhibit the charging by comparing the highest value of this stored temperature with the determination temperature (TL).

Where the highest temperature of the secondary battery 3 has exceeded the determination temperature in the previous charge, it is highly probable that, the secondary battery 3 is in an abnormal state, for example, because of occurrence of internal short circuit and heat generation or thermal deterioration. Accordingly, when the temperature of the secondary battery 3 in the previous cycle that has been stored as the charge data in the storage unit 54 exceeds the determination temperature (TL) the abnormal battery can be prevented from being unreasonably charged by prohibiting the charging with the charge control unit 51. As a result, safety of the secondary battery 3 can be ensured.

When the SOC at the time the previous charge has ended that has been stored as the charge data in the storage unit 54 exceeds a determination value that has been stored in advance, the charge prohibition determination unit 52 prohibits the charging with the charge control unit 51. The determination value is set to the aforementioned standard value (for example, 100%).

Where the SOC of the secondary battery 3 that has been calculated by the SOC calculation unit 53 becomes a standard value, the charge control unit 51 has to end the pulse charging. Therefore, the standard value corresponds to the upper value of the SOC range that can be attained by the secondary battery 3 in a normal state.

Thus, where the SOC at the time the previous charge has ended that has been stored as the charge data in the storage unit 54 is assumed to have exceeded the determination value, an abnormality can be assumed to have occurred in the previous charge. Accordingly, where the SOC at the time the previous charge of the secondary battery 3 has ended that has been stored as the charge data in the storage unit 54 exceeds the determination value, the abnormal battery can be prevented from being unreasonably charged by prohibiting the charging with the charge control unit 51. As a result, safety of the secondary battery 3 can be ensured.

Further, when the highest charge voltage, which is the highest value of terminal voltage in the charging period of the previous cycle exceeds a determination voltage that has been stored in advance as a voltage at which the secondary battery 3 is at risk of deterioration, on the basis of the terminal voltage that has been stored as the charge data in the storage unit 54, the charge prohibition determination unit 52 prohibits the charging with the charge control unit 51. For example, a voltage equal to or higher than the upper limit voltage VH can be used as the determination voltage.

Where the battery voltage detected by the voltage detection unit 2 is equal to or higher than the upper limit voltage VH, the charge control unit 51 switches off the switch unit 1 and cuts off the charge current. Therefore, if the battery is normal, the battery voltage is equal to or lower than the determination voltage and should not exceed the determination voltage. Accordingly, where the highest value of charging in the charge period of the previous cycle that has been stored as the charge data in the storage unit 54 exceeds the determination voltage, the abnormal battery can be prevented from being unreasonably charged by prohibiting the charging with the charge control unit 51. As a result, safety of the secondary battery 3 can be ensured.

When the highest voltage during previous charge is stored as the charge data in the storage unit 54, the charge prohibition determination unit 52 may determine whether to inhibit the charging by comparing this highest voltage with the determination voltage. Further, when the terminal voltage of the secondary battery 3 in the previous charge has been stored as a plurality of charge data in a time series in the storage unit 54, the charge prohibition determination unit 52 may determine whether to inhibit the charging by comparing the highest value of the terminal voltage with the determination voltage.

A flowchart of charge control in the embodiment of the invention is shown in FIG. 3. The explanation will be given below by referring to respective steps of charge control. First, where the battery pack 10 including the charge control circuit 11 is connected to the mobile electronic device 20 or a special charging device (S1), the charge prohibition determination unit 52 recognizes charge data of the previous cycle that have been stored in the storage unit 54 (S2) and compares the charge data of the previous cycle with a predetermined threshold (S3 to S6). Thus, the charge prohibition determination unit 52 determines that the battery voltage at the previous charge end is lower than the upper limit voltage VH (S3), the previous charge time is shorter than the charge time (tL) that has been set in advance (S4), the battery temperature during the previous charge is lower than the temperature (TL) that has been set in advance (S5), and the state of charge (SOC) at the previous charge end is lower than the SOC (determination value) that has been set in advance (S6). Where the required conditions are fulfilled, the charge is started by the charge control unit 51 and at this stage a charge current flows to the battery.

The charge of the secondary battery 3 is thereafter continued by the charge control unit 51 (S7 to S9), an SOC is determined from a quantity of electricity based on the rated capacity of the secondary battery 3, and a time at which the SOC becomes, for example, 100%, that is, the fully charged state is assumed, the charge is stopped (S10). After the battery voltage (V), charge time (t), battery temperature (T), and SOC (S) have been recorded and held, the charging is ended (S11 to S12).

Where any one of the determination conditions of S3 to S6 is not fulfilled, the battery is determined to be abnormal and the charge thereof is prohibited (S20). Therefore, the battery that has once been determined to be "prohibited for charging" will be recognized as abnormal at a time of charging (S2) even when a separated and different mobile electronic device or charging device is used. Therefore, such a battery cannot be charged and unsafe charge thereof cannot be conducted.

As described hereinabove, with the charge control method in accordance with the present invention, charge data at a time of charging a secondary battery for use in a mobile electronic device are recorded and held in advance, charge data of the previous cycle are read at the time of charging and compared with a predetermined threshold value to determine charge prohibition. As a result, safety of the battery can be ensured even in a case in which an abnormality such as an internal short circuit occurs when the battery is dropped down or hit and thus subjected to mechanical stresses, or a circuit element that determines a constant that serves as a standard such as a standard voltage of charge control in the charging device changes with time or changes due to deterioration and the conducted control is not based on a control constant such as a charge voltage that has been set in advance. Therefore, when a secondary battery with a high energy density is used in a mobile electronic device or the like, charge control of the secondary battery can be conducted with good efficiency and safely.

As a result, in a case where the secondary battery is externally damaged or internal damage occurs due to repeated charging and discharging, thereby increasing the internal resistance of the secondary battery, or when an internal short circuit occurs in a case of significant damage, the unreasonable charging of such an abnormal battery can be avoided and safety with respect to the battery or mobile electronic device can be ensured.

Thus, a secondary battery charge control method according to one aspect of the present invention includes: a charge control step of executing charging by supplying a charge current to a secondary battery; a charge information acquisition step of acquiring information relating to the charging executed in the charge control step; a storage step of storing the information acquired in the charge information acquisition step as charge data; and a charge inhibition determination step of determining whether to inhibit the charging in the charge control step on the basis of the charge data of a previous cycle that have been stored in the storage step when charging in the charge control step is started again after charging in the charge control step has been completed.

A charge control circuit according to one aspect of the invention includes: a charge control unit that executes charging by supplying a charge current to a secondary battery; a charge information acquisition unit that acquires information relating to the charging executed by the charge control unit; a storage unit that stores the information acquired by the charge information acquisition unit as charge data; and a charge inhibition determination unit that determines whether to inhibit the charging by the charge control unit on the basis of the charge data of a previous cycle that have been stored in the storage unit when charging by the charge control unit is started again after charging by the charge control unit has been completed.

With such a configuration, when charge data acquired during a previous charge demonstrate any abnormality, unreasonable charging of such an abnormal secondary battery can be avoided by inhibiting the repeated charging. As a result, safety of the secondary battery can be ensured.

It is preferred that the charge information acquisition step include a timing step of measuring a charge time from start to end of the charging in the charge control step; the storage step include storing a charge time measured in the timing step as the charge data, and the charge inhibition determination step include inhibiting the charging in the charge control step when a charge time of a previous cycle that has been stored as charge data in the storage step exceeds a charge time that has been preset to be equal to or longer than a time necessary to charge fully the secondary battery in the charge control step from a state with an SOC of 0%.

It is preferred that the charge information acquisition unit include a timing unit that measures a charge time from start to end of the charging by the charge control unit; the storage unit store a charge time measured by the timing unit as the charge data, and the charge inhibition determination unit inhibit the charging by the charge control unit when a charge time of a previous cycle that has been stored as the charge data in the storage unit exceeds a charge time that has been preset to be equal to or longer than a time necessary to charge fully the secondary battery by the charge control unit from a state with an SOC of 0%.

When the charge time during the previous charge exceeds a charge time that has been set to be equal to or longer than a time necessary to charge fully the secondary battery from a state with an SOC of 0%, some kind of abnormality can be assumed to have occurred during the previous charge. Accordingly, with this configuration, when the charge time during the previous charge exceeds a charge time that has been set to be equal to or longer than a time necessary to charge fully the secondary battery from a state with an SOC of 0%, unreasonable charging of such an abnormal secondary battery can be avoided by inhibiting the repeated charging. As a result, safety of the secondary battery can be ensured.

It is preferred that the charge information acquisition step include a temperature detection step of detecting a temperature of the secondary battery in the charge period in the charge control step; the storage step include storing the temperature detected in the temperature detection step as the charge data, and the charge inhibition determination step include inhibiting the charging in the charge control step when a temperature of a previous cycle that has been stored as the charge data in the storage step exceeds a determination temperature that has been preset as a temperature at which the secondary battery is at risk of deterioration.

It is preferred that the charge information acquisition unit include a temperature detection unit that detects a temperature of the secondary battery in the charge period of the charge control unit; the storage unit store the temperature detected by the temperature detection unit as the charge data, and the charge inhibition determination unit inhibit the charging by the charge control unit when a temperature of a previous cycle that has been stored as the charge data in the storage unit exceeds a determination temperature that has been preset as a temperature at which the secondary battery is at risk of deterioration.

Where the temperature of the secondary battery has exceeded the determination temperature in the previous charge, it is highly probable that, the secondary battery is in an abnormal state, for example, because of occurrence of internal short circuit and heat generation or thermal deterioration. Accordingly, with such a configuration, when the temperature of the secondary battery in the previous charge exceeds the determination temperature, the abnormal secondary battery can be prevented from being unreasonably charged by prohibiting the repeated charging. As a result, safety of the secondary battery can be ensured.

Further, it is preferred that the charge information acquisition step include an SOC calculation step of calculating an SOC of the secondary battery; the storage step include storing the SOC of the secondary battery that has been calculated in the SOC calculation step as the charge data when the charging in the charge control step ends, and the charge inhibition determination step include inhibiting the charging in the charge control step when the SOC stored as the charge data in the storage step at the time the previous charge has ended exceeds a determination value that has been set as an upper limit value of an SOC range that can be attained by the secondary battery in a normal state.

Further, it is preferred that the charge information acquisition unit include an SOC calculation unit that calculates an SOC of the secondary battery; the storage unit store an SOC of the secondary battery that has been calculated in the SOC calculation unit as the charge data when the charging by the charge control unit has ended, and the charge inhibition determination unit inhibit the charging in the charge control unit when the SOC stored as the charge data in the storage unit at the time the previous charge has ended exceeds a determination value that has been set as an upper limit value of an SOC range that can be attained by the secondary battery in a normal state.

Where the SOC of the secondary battery exceeds the determination value that has been set as an upper limit value of an SOC range in the normal state when the previous charge has ended, it is highly probable that the secondary battery is in an abnormal state. Accordingly, with such a configuration, when the SOC of the secondary battery at a time the previous charge has been completed exceeds the determination value, the abnormal secondary battery can be prevented from being unreasonably charged by prohibiting the repeated charging. As a result, safety of the secondary battery can be ensured.

It is preferred that the charge information acquisition step include a voltage detection step of detecting a terminal voltage of the secondary battery during the charge period in the charge control step; the storage step include storing the terminal voltage that has been detected in the voltage detection step as the charge data, and the charge inhibition determination step include inhibiting the charging in the charge control step when a charge highest voltage that is a highest value of a terminal voltage in a charge period of a previous cycle exceeds a determination voltage preset as a voltage at which the secondary battery is at risk of deterioration, on the basis of a terminal voltage stored as the charge data in the storage step.

Further, it is preferred that the charge information acquisition unit include a voltage detection unit that detects a terminal voltage of the secondary battery during the charge period by the charge control unit; the storage unit store a terminal voltage that has been detected by the voltage detection unit as the charge data, and the charge inhibition determination unit inhibit the charging in the charge control unit when a charge highest voltage that is a highest value of a terminal voltage in a charge period of a previous cycle exceeds a determination voltage that has been preset as a voltage at which the secondary battery is at risk of deterioration, on the basis of a terminal voltage stored as the charge data in the storage unit.

When the charge highest voltage that is a highest value of a terminal voltage in a charge period of a previous cycle exceeds the determination voltage that has been set in advance as a voltage at which the secondary battery is at risk of deterioration, it is highly probable that the secondary battery is in an abnormal state. Accordingly, with such a configuration, when the charge highest voltage that is a highest value of a terminal voltage in a charge period of a previous cycle exceeds the determination voltage, the abnormal secondary battery can be prevented from being unreasonably charged by prohibiting the repeated charging. As a result, safety of the secondary battery can be ensured.

It is preferred that the charge control step includes charging the secondary battery by supplying a constant charge current to the secondary battery, and forming a pulse charge current by stopping and supplying the charge current, the charge control step includes stopping the supply of the charge current when a terminal voltage of the secondary battery becomes equal to or higher than an upper limit voltage that has been set to a voltage higher than an open circuit voltage at a time the secondary battery is fully charged, and supplying the charge current when the terminal voltage of the secondary battery becomes equal to or lower than a lower limit voltage that has been set to be equal to or higher than an open circuit voltage at a time the secondary battery is fully charged.

Further, it is preferred that the charge control unit charges the secondary battery by supplying a constant charge current to the secondary battery,and forming a pulse charge current by stopping and supplying the charge current, the charge control unit stopping the supply of the charge current when a terminal voltage of the secondary battery becomes equal to or higher than an upper limit voltage that has been set to a voltage higher than an open circuit voltage at a time the secondary battery is fully charged, and supplying the charge current when the terminal voltage of the secondary battery becomes equal to or lower than a lower limit voltage that has been set to be equal to or higher than an open circuit voltage at a time the secondary battery is fully charged.

With such a configuration, where the charging of secondary battery is started, the pulsed charge current is supplied and the secondary battery is charged by stopping the supply of the charge current if the terminal voltage of the secondary battery is equal to or higher than the upper limit voltage and supplying the charge current if the terminal voltage is equal to or lower than the lower limit voltage. As a result, even if charging of the secondary battery in a fully charged state is started, the terminal voltage immediately reaches the upper limit voltage and the supply of the charge current is stopped. Therefore, the possibility of recharging the charged secondary battery and realizing an overcharged state thereof is reduced.

It is also preferred that the secondary battery be a lithium secondary battery.

Because a lithium secondary battery has a high energy density, it is highly necessary to ensure safety.

Industrial Applicability

The charge control method and charge control circuit in accordance with the present invention can be advantageously used in a variety of devices and systems equipped with batteries, for examples, mobile electronic devices such as portable personal computers, digital cameras, and cellular phones, vehicles such as electric automobiles and hybrid cars, and power source systems in which a secondary battery is combined with a solar cell or a power generating device, in particular the charge control method and charge control circuit are suitable for secondary batteries for use in mobile electronic devices.

The invention claimed is:

1. A secondary battery charge control method comprising:
a charge control step of executing charging by supplying a charge current to a secondary battery;
a charge information acquisition step of acquiring information relating to the charging executed in the charge control step;
a storage step of storing the information acquired in the charge information acquisition step as charge data; and
a charge inhibition determination step of determining whether to inhibit the charging in the charge control step on the basis of the charge data of a previous cycle that have been stored in the storage step when charging in the charge control step is started again after charging in the charge control step has been completed, wherein
the charge information acquisition step includes a timing step of measuring a charge time from start to end of the charging in the charge control step,
the storage step includes storing a charge time measured in the timing step as the charge data, and
the charge inhibition determination step includes inhibiting the charging in the charge control step when a charge time of a previous cycle that has been stored as charge data in the storage step exceeds a charge time that has been preset to be equal to or longer than a time necessary to charge fully the secondary battery in the charge control step from a state with an SOC of 0%.

2. A secondary battery charge control method comprising:
a charge control step of executing charging by supplying a charge current to a secondary battery;
a charge information acquisition step of acquiring information relating to the charging executed in the charge control step;
a storage step of storing the information acquired in the charge information acquisition step as charge data; and
a charge inhibition determination step of determining whether to inhibit the charging in the charge control step on the basis of the charge data of a previous cycle that have been stored in the storage step when charging in the charge control step is started again after charging in the charge control step has been completed, wherein
the charge information acquisition step includes a temperature detection step of detecting a temperature of the secondary battery in the charge period in the charge control step,
the storage step includes storing the temperature detected in the temperature detection step as the charge data, and
the charge inhibition determination step includes inhibiting the charging in the charge control step when a temperature of a previous cycle that has been stored as the charge data in the storage step exceeds a determination temperature that has been preset as a temperature at which the secondary battery is at risk of deterioration.

3. A secondary battery charge control method comprising:
a charge control step of executing charging by supplying a charge current to a secondary battery;
a charge information acquisition step of acquiring information relating to the charging executed in the charge control step;
a storage step of storing the information acquired in the charge information acquisition step as charge data; and
a charge inhibition determination step of determining whether to inhibit the charging in the charge control step on the basis of the charge data of a previous cycle that have been stored in the storage step when charging in the charge control step is started again after charging in the charge control step has been completed, wherein the charge information acquisition step includes an SOC calculation step of calculating an SOC of the secondary battery, the storage step includes storing the SOC of the secondary battery that has been calculated in the SOC calculation step as the charge data when the charging in the charge control step ends, and the charge inhibition determination step includes inhibiting charging in the charge control step when the SOC stored as the charge data in the storage step at the time the previous charge has ended exceeds a determination value that has been set as an upper limit value of an SOC range that can be attained by the secondary battery in a normal state.

4. A secondary battery charge control method comprising:

a charge control step of executing charging by supplying a charge current to a secondary battery;

a charge information acquisition step of acquiring information relating to the charging executed in the charge control step;

a storage step of storing the information acquired in the charge information acquisition step as charge data; and a charge inhibition determination step of determining whether to inhibit the charging in the charge control step on the basis of the charge data of a previous cycle that have been stored in the storage step when charging in the charge control step is started again after charging in the charge control step has been completed, wherein the charge information acquisition step includes a voltage detection step of detecting a terminal voltage of the secondary battery during the charge period in the charge control step, the storage step includes storing the terminal voltage that has been detected in the voltage detection step as the charge data, and the charge inhibition determination step includes inhibiting the charging in the charge control step when a charge highest voltage that is a highest value of a terminal voltage in a charge period of a previous cycle exceeds a determination voltage preset as a voltage at which the secondary battery is at risk of deterioration, on the basis of a terminal voltage stored as the charge data in the storage step.

5. A secondary battery charge control method comprising:

a charge control step of executing charging by supplying a charge current to a secondary battery;

a charge information acquisition step of acquiring information relating to the charging executed in the charge control step;

a storage step of storing the information acquired in the charge information acquisition step as charge data; and a charge inhibition determination step of determining whether to inhibit the charging in the charge control step on the basis of the charge data of a previous cycle that have been stored in the storage step when charging in the charge control step is started again after charging in the charge control step has been completed, wherein the charge control step includes charging the secondary battery by supplying a constant charge current to the secondary battery, and forming a pulse charge current by stopping and supplying the charge current, the charge control step includes stopping the supply of the charge current when a terminal voltage of the secondary battery becomes equal to or higher than an upper limit voltage that has been set to a voltage higher than an open circuit voltage at a time the secondary battery is fully charged, and supplying the charge current when the terminal voltage of the secondary battery becomes equal to or lower than a lower limit voltage that has been set to be equal to or higher than an open circuit voltage at a time the secondary battery is fully charged.

6. The secondary battery charge control method according to claim 1, wherein the secondary battery is a lithium secondary battery.

7. A charge control circuit comprising:

a charge control unit that executes charging by supplying a charge current to a secondary battery;

a charge information acquisition unit that acquires information relating to the charging executed by the charge control unit, a storage unit that stores the information acquired by the charge information acquisition unit as charge data, and a charge inhibition determination unit that determines whether to inhibit the charging by the charge control unit on the basis of the charge data of a previous cycle that have been stored in the storage unit when charging by the charge control unit is started again after charging by the charge control unit has been completed, wherein the charge information acquisition unit includes a timing unit that measures a charge time from start to end of the charging by the charge control unit, the storage unit stores a charge time measured by the timing unit as the charge data, and the charge inhibition determination unit inhibits the charging by the charge control unit when a charge time of a previous cycle that has been stored as the charge data in the storage unit exceeds a charge time that has been preset to be equal to or longer than a time necessary to charge fully the secondary battery by the charge control unit from a state with an SOC of 0%.

8. A charge control circuit comprising:

a charge control unit that executes charging by supplying a charge current to a secondary battery;

a charge information acquisition unit that acquires information relating to the charging executed by the charge control unit, a storage unit that stores the information acquired by the charge information acquisition unit as charge data, and a charge inhibition determination unit that determines whether to inhibit the charging by the charge control unit on the basis of the charge data of a previous cycle that have been stored in the storage unit when charging by the charge control unit is started again after charging by the charge control unit has been completed, wherein the charge information acquisition unit includes a temperature detection unit that detects a temperature of the secondary battery in the charge period of the charge control unit, the storage unit stores the temperature detected by the temperature detection unit as the charge data, and the charge inhibition determination unit inhibits the charging by the charge control unit when a temperature of a previous cycle that has been stored as the charge data in the storage unit exceeds a determination temperature that has been preset as a temperature at which the secondary battery is at risk of deterioration.

9. A charge control circuit comprising:

a charge control unit that executes charging by supplying a charge current to a secondary battery;

a charge information acquisition unit that acquires information relating to the charging executed by the charge control unit, a storage unit that stores the information acquired by the charge information acquisition unit as charge data, and a charge inhibition determination unit that determines whether to inhibit the charging by the charge control unit on the basis of the charge data of a previous cycle that have been stored in the storage unit when charging by the charge control unit is started again after charging by the charge control unit has been completed, wherein the charge information acquisition unit includes an SOC calculation unit that calculates an SOC of the secondary battery, the storage unit stores an SOC of the secondary battery that has been calculated in the SOC calculation unit as the charge data when the charging by the charge control unit has ended, and the charge inhibition determination unit inhibits the charging in the charge control unit when the SOC stored as the charge data in the storage unit at the time the previous charge has ended exceeds a determination value that has been set as an upper limit value of an SOC range that can be attained by the secondary battery in a normal state.

10. A charge control circuit comprising:

a charge control unit that executes charging by supplying a charge current to a secondary battery;

a charge information acquisition unit that acquires information relating to the charging executed by the charge control unit, a storage unit that stores the information acquired by the charge information acquisition unit as charge data, and a charge inhibition determination unit that determines whether to inhibit the charging by the charge control unit on the basis of the charge data of a previous cycle that have been stored in the storage unit when charging by the charge control unit is started again after charging by the charge control unit has been completed, wherein the charge information acquisition unit includes a voltage detection unit that detects a terminal voltage of the secondary battery during the charge period by the charge control unit;

the storage unit stores a terminal voltage that has been detected by the voltage detection unit as the charge data, and the charge inhibition determination unit inhibits the charging in the charge control unit when a charge highest voltage that is a highest value of a terminal voltage in a charge period of a previous cycle exceeds a determination voltage that has been preset as a voltage at which the secondary battery is at risk of deterioration, on the basis of a terminal voltage stored as the charge data in the storage unit.

11. A charge control circuit comprising:

a charge control unit that executes charging by supplying a charge current to a secondary battery;

a charge information acquisition unit that acquires information relating to the charging executed by the charge control unit, a storage unit that stores the information acquired by the charge information acquisition unit as charge data, and a charge inhibition determination unit that determines whether to inhibit the charging by the charge control unit on the basis of the charge data of a previous cycle that have been stored in the storage unit when charging by the charge control unit is started again after charging by the charge control unit has been completed, wherein the charge control unit charges the secondary battery by supplying a constant charge current to the secondary battery, and forming a pulse charge current by stopping and supplying the charge current, the charge control unit stopping the supply of the charge current when a terminal voltage of the secondary battery becomes equal to or higher than an upper limit voltage that has been set to a voltage higher than an open circuit voltage at a time the secondary battery is fully charged, and supplying the charge current when the terminal voltage of the secondary battery becomes equal to or lower than a lower limit voltage that has been set to be equal to or higher than an open circuit voltage at a time the secondary battery is fully charged.

12. The charge control circuit according to claim 7, wherein the secondary battery is a lithium secondary battery.

13. A charge control circuit comprising:

a charge control unit that executes charging by supplying a charge current to a secondary battery, the charge control unit charging the secondary battery by supplying a constant charge current to the secondary battery, and forming a pulse charge current by stopping and supplying the charge current, the charge control unit stopping the supply of the charge current when a terminal voltage of the secondary battery becomes equal to or higher than an upper limit voltage that has been set to a voltage higher than an open circuit voltage at a time the secondary battery is fully charged, and supplying the charge current when the terminal voltage of the secondary battery becomes equal to or lower than a lower limit voltage that has been set to be equal to or higher than an open circuit voltage at a time the secondary battery is fully charged;

a charge information acquisition unit that acquires information relating to the charging executed by the charge control unit, the charge information acquisition unit including; a timing unit that measures a charge time from start to end of the charging by the charge control unit, a temperature detection unit that detects a temperature of the secondary battery in the charge period of the charge control unit, an SOC calculation unit that calculates an SOC of the secondary battery, and a voltage detection unit that detects a terminal voltage of the secondary battery during the charge period by the charge control unit;

a storage unit that stores the information acquired by the charge information acquisition unit as charge data, the storage unit storing a charge time measured by the timing unit as the charge data, the temperature detected by the temperature detection unit as the charge data, an SOC of the secondary battery that has been calculated in the SOC calculation unit as the charge data when the charging by the charge control unit has ended, and a terminal voltage that has been detected by the voltage detection unit as the charge data; and a charge inhibition determination unit that determines whether to inhibit the charging by the charge control unit on the basis of the charge data of a previous cycle that have been stored in the storage unit when charging by the charge control unit is started again after charging by the charge control unit has been completed, the charge inhibition determination unit inhibiting the charging by the charge control unit when a charge time of a previous cycle that has been stored as the charge data in the storage unit exceeds a charge time that has been preset to be equal to or longer than a time necessary to charge fully the secondary battery by the charge control unit from a state with an SOC of 0%, or when a temperature of a previous cycle that has been stored as the charge data in the storage unit exceeds a determination temperature that has been preset as a temperature at which the secondary battery is at risk of deterioration, or when the SOC stored as the charge data in the storage unit at the time the previous charge has ended exceeds a determination value that has been set as an upper limit value of an SOC range that can be attained by the secondary battery in a normal state, or when a charge highest voltage that is a highest value of a terminal voltage in a charge period of a previous cycle exceeds a determination voltage that has been preset as a voltage at which the secondary battery is at risk of deterioration, on the basis of a terminal voltage stored as the charge data in the storage unit.

* * * * *